Dec. 19, 1950     A. G. ALLISON ET AL     2,534,652
METHOD OF MAKING COMPOSITE REFRACTORY
Filed June 10, 1946
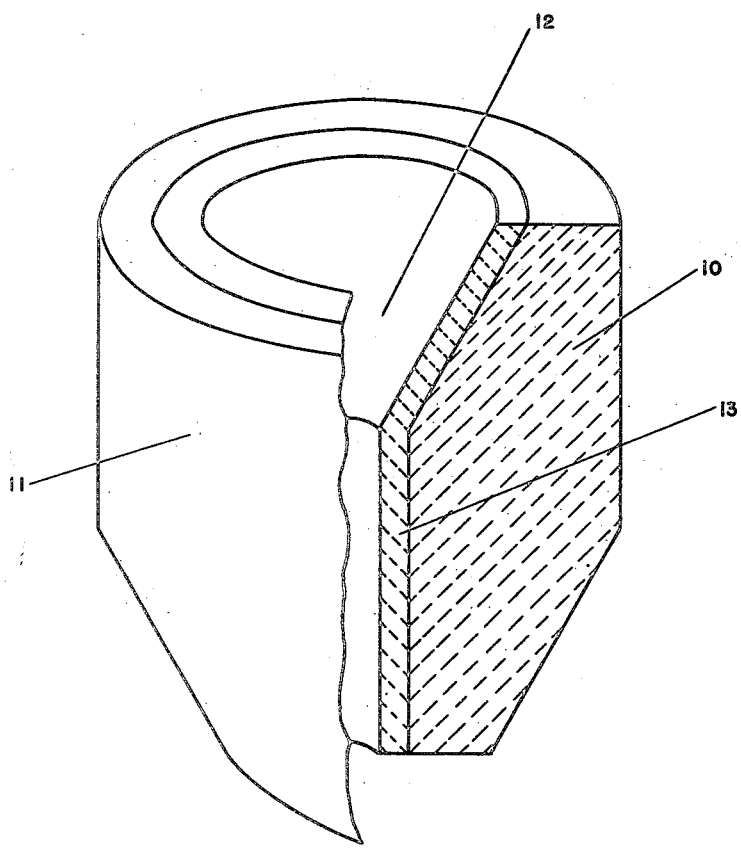
INVENTORS
Chester R. Austin
Adrian G. Allison
By
Kwis, Hudson, Boughton & Williams
Attorneys Patented Dec. 19, 1950

2,534,652

UNITED STATES PATENT OFFICE 2,534,652

METHOD OF MAKING COMPOSITE REFRACTORY

Adrian G. Allison, Lake Worth, Fla., and Chester R. Austin, Columbus, Ohio, assignors, by mesne assignments, to The Ferro Engineering Company, Cleveland, Ohio, a corporation of Ohio Application June 10, 1946, Serial No. 675,668

6 Claims. (Cl. 25—156)

This invention relates to improvements in refractories, and it has to do primarily with a method of producing composite refractories comprising a relatively massive body section and a surface layer of different composition. The invention is particularly applicable, for example, to the production of a composite refractory nozzle, for pouring or teeming molten materials, having a lined bore and/or seat section.

The production of composite refractories has presented many difficulties. As an example, this problem may be illustrated by the production of a composite refractory nozzle having a body portion composed primarily of a refractory other than zirconium silicate with the seat and bore sections thereof lined with a refractory composition composed predominantly of zirconium silicate, as disclosed and claimed in the copending application of Chester R. Austin, Serial No. 675,667, filed of even date herewith, now abandoned.

In the production of such a composite refractory, the body portion may be formed of the desired composition in any desired manner, such as by pressing or by casting, and subsequently dried. In the same way, a liner may be separately formed, for example, by slip casting, and, after drying, inserted in the body portion and fired. In such a process, however, considerable difficulty is encountered in developing the desired bond between the two sections, and cracking often develops.

Some of these difficulties may be circumvented by a multiple-mold slip-casting process in which the lining composition is prepared as a suitable slip, poured into a nonabsorbent mold, and allowed to stand until the desired lining thickness is built up around an absorbent internal core. The excess lining slip is then drained out of the nonabsorbent mold; an absorbent mold conforming to the exterior surface of the final composite body is substituted therefor; a slip comprising the body composition is poured into the porous mold and allowed to set until solid. The composite refractory is then dried and fired in accordance with usual practice. Such a process is capable of producing well-bonded composite refractories having excellent properties; however, the process is time-consuming and requires a large number of complex and expensive molds.

It is, therefore, a primary object of this invention to provide an improved process for the production of composite refractories.

A further object of this invention is to provide a method of producing composite refractories that is rapid and that does not require a large number of expensive molds.

Another object is to provide an improved, rapid, and economical method for the production of well-bonded composite refractories.

Still another object is to provide an improved process for the production of composite refractory nozzles having a seat and/or bore section lined with a material composed predominantly of zirconium silicate.

Other and further objects and advantages of this invention will become apparent from the following detailed description thereof when read in conjunction with the accompanying drawing, in which:

The figure represents an isometric view, partly in cross-section, of a composite refractory nozzle as one example of a composite refractory shape produced in accordance with the present invention.

In general, the present invention is based upon the discovery that composite refractory shapes can be readily and economically produced by a process in which the body portion is pressed from the refractory composition and then, while still in the moist condition, utilized as a mold into which the lining material is slip cast. By this process, the expense of porous molds may be drastically reduced or even completely eliminated and production may be greatly accelerated.

This particular process may be illustrated by reference to the accompanying drawing which represents one specific example of a composite refractory nozzle produced in accordance with this invention. In this particular example, the body portion 10 of nozzle 11 is produced in a manner well known in the art, for example, by pressing in suitable dies a soft blank cut from an extruded slug of the desired composition. While the pressed body 11 is still in a moist condition, the internal cavity 12 is filled with a casting slip of the desired composition and allowed to set until the desired lining thickness 13 is formed; the excess casting slip is then drained from the cavity, and the composite body is dried and fired.

It is essential to the success of this process that the slip-casting step be initiated prior to extensive drying of the moist pressed body portion; otherwise, the slip-cast portion tends to crack on subsequent drying, and an inadequate bond is developed between the two portions of the composite refractory.

The use of porous molds may be completely eliminated by the use of the above-described drain-casting method for forming the liner; however, the use of this process may, in some cases, result in an objectionable roughness on the surface of the slip-cast liner. This roughness may be eliminated through the use of a core-casting method, for the production of the liner, in which a porous core of the desired dimensions is fitted in the cavity formed by the pressed body and the desired composition is slip-cast between the moist body and the porous core. The use of this procedure not only results in a smooth interior surface but it also is much more rapid than the drain-casting method previously described.

The choice of refractory compositions for the body and lining portions of the composite refractory will depend, of course, upon the particular application involved. Nearly any refractory composition can be suitably prepared for pressing or for slip-casting. In the production of composite refractory nozzles, for example, utilizing a lining composed predominantly of zirconium silicate, the body portion may be composed of a refractory clay, such as fire clay, kaolin, or ball clay, or of a refractory material such as calcined kyanite, chromite, or magnesia. These refractory materials may also be used in conjunction with various plastic clays and other binders to facilitate the pressing operation. The exact amount of water required will depend primarily upon the pressing conditions; however, between 10 and 20% has been found generally desirable for use in this process, with about 15% preferred for most refractory mixes investigated. The presence of this amount of water insures a good bond in the final composite refractory. The casting slip should contain at least about 70% of zirconium silicate, on a dry basis, and preferably at least 85%. Minor amounts of plastic clay and other materials such as electrolytes may also be added. Sufficient water is added to give a slip of the desired consistency.

In one particular adaptation of this process, a composite refractory nozzle was produced by pressing a body portion from a refractory mixture composed of 24% Georgia kaolin from the United Clay Mines Corporation, 6% C and C ball clay from the H. C. Spinks Clay Company, and 70% crushed Ironton fire brick, to which about 16% of water had been added. This mixture was extruded through a de-airing extrusion machine and pressed to the desired shape in a steel die. Immediately after pressing, a plaster core was fitted in the body cavity, leaving the proper clearance for the desired lining, and a slip composed of 12% Georgia kaolin, 3% C and C ball clay, and 85% zirconium silicate, to which 14.2% of water and 0.133% tetrasodium pyrophosphate had been added, was introduced. When the lining was completely set, the core was removed and the composite nozzle was allowed to air-dry for approximately three hours. It was then dried in an oven at 180° F. and subsequently burned to about 2500° F. in approximately 25 hours and held at this temperature for about four hours. There was no cracking or other evidence of an imperfect bond.

In the foregoing examples, and in the appended claims, all percentages are given as percent by weight.

From the foregoing description, it will be evident that the present invention relates to a process for forming a composite refractory in which a pressed body portion, while in the moist condition, is utilized as the mold for a subsequently slip-cast liner. By the use of this process, expensive porous molds may be eliminated and production facilitated.

Modifications and variations of the present invention as above-described will become apparent to those skilled in the art, and such alterations as may be included within the scope of the here- after-appended claims are considered as constituting a part of the present invention.

What is claimed is:

1. In the production of a composite refractory, the steps which comprise pressing a body section from a refractory composition composed predominantly of a refractory clay and containing from about 10 to about 20% of water and subsequently, while still in moist condition, utilizing said body section as a mold into which a lining section composed predominantly of zirconium silicate is slip-cast.

2. The method of producing a hollow composite refractory article having a body portion and a liner portion, which comprises forming a body section from a moist refractory composition and, while it is in said moist condition, utilizing the body section as a mold into which a lining section is slip-cast, and subsequently drying and firing the composite refractory.

3. The method of producing a hollow composite refractory article having a body portion and a liner portion, which comprises pressing a body section from a moist refractory composition containing from about 10 to about 20% of water and subsequently, while it is in said moist condition, utilizing the body section as a mold into which a lining section is slip-cast and, upon completion of the slip-casting step, drying and firing the composite refractory.

4. The method of producing a hollow composite refractory article having a body portion and a liner portion, which comprises forming a body section from a moist refractory composition composed predominantly of a refractory clay and, while it is in said moist condition, utilizing said body section as a mold into which the lining section composed predominantly of zirconium silicate is slip-cast, and subsequently drying and firing the composite refractory.

5. The method of producing a composite refractory nozzle having a body portion and a liner portion, which comprises forming a body section from a refractory composition composed predominantly of a moist refractory clay and, while it is in said moist condition, utilizing said body section as a mold into which a lining section composed of at least about 85% zirconium silicate is slip-cast, and subsequently drying and firing the composite refractory.

6. The method of producing a composite refractory nozzle having a body portion and a liner portion, which comprises pressing a body section from a refractory composition composed predominantly of fire clay and containing from about 10 to about 20% of water and, thereafter while it is in said moist condition, utilizing said body section as a mold into which the lining section composed of at least about 85% zirconium silicate is slip-cast, and subsequently drying and firing the composite refractory.

ADRIAN G. ALLISON.
CHESTER R. AUSTIN.

REFERENCES CITED

The following references are of record in the file of this patent:

UNITED STATES PATENTS

| Number | Name | Date |
|---|---|---|
| 1,400,489 | Lowry | Dec. 13, 1921 |
| 1,609,427 | Queneau | Dec. 7, 1926 |
| 1,675,119 | Marden | June 26, 1928 |
| 1,754,838 | Showers | Apr. 15, 1930 |
| 2,303,304 | Schleicher et al. | Nov. 24, 1942 |